US008144546B2

(12) United States Patent
Lovik et al.

(10) Patent No.: US 8,144,546 B2
(45) Date of Patent: Mar. 27, 2012

(54) METHOD AND APPARATUS FOR DETECTION AND CLASSIFICATION OF A SWIMMING OBJECT

(75) Inventors: Arne Lovik, Stjordal (NO); Tor Knudsen, Borre (NO); Leiv Inge Steig, Krokstadelva (NO)

(73) Assignee: Kongsberg Defence & Aerospace AS, Kongsberg (NO)

( * ) Notice: Subject to any disclaimer, the term of this patent is extended or adjusted under 35 U.S.C. 154(b) by 114 days.

(21) Appl. No.: 12/457,228

(22) Filed: Jun. 4, 2009

(65) Prior Publication Data

US 2010/0046326 A1 Feb. 25, 2010

(30) Foreign Application Priority Data

Jun. 6, 2008 (NO) .................................... 20082668

(51) Int. Cl.
*G01S 15/87* (2006.01)
(52) U.S. Cl. ........................................................ 367/139
(58) Field of Classification Search ................... 367/139
See application file for complete search history.

(56) References Cited

U.S. PATENT DOCUMENTS

| 3,789,128 | A | * | 1/1974 | Murphree | ........................... 434/8 |
| 4,991,143 | A | * | 2/1991 | Foss et al. | ........................... 367/1 |
| 5,138,587 | A | * | 8/1992 | Mason | ........................... 367/136 |
| 5,150,335 | A | * | 9/1992 | Hoffman | ........................... 367/101 |
| 5,168,471 | A | | 12/1992 | Parra | |
| 5,168,473 | A | * | 12/1992 | Parra | ........................... 367/124 |
| 5,377,163 | A | | 12/1994 | Simpson | |
| 5,559,759 | A | * | 9/1996 | Gerstein et al. | ........................... 367/139 |
| 5,684,755 | A | * | 11/1997 | Saunders | ........................... 367/139 |
| 5,909,409 | A | * | 6/1999 | Barber et al. | ........................... 367/125 |
| 2008/0043574 | A1 | * | 2/2008 | Rooney et al. | ........................... 367/87 |

FOREIGN PATENT DOCUMENTS

WO WO 2007/127271 A2 11/2007

OTHER PUBLICATIONS

Jonathan P Towle et al: "Low-cost acoustic sensors for littoral anti-submarine warfare (ASW)", Proceedings of SPIE, vol. 6538, Jan. 1, 2007, pp. 653814-653814-6, XP55006806.
Howell B P et al: "Passive sonar recognition and analysis using hybrid neural networks", Oceans 2003, MTS/IEEE Proceedings, San Diego, CA, Sep. 22, 2003, pp. 1917-1924, vol. 4, XP031871035.
European Search Report, dated Sep. 12, 2011, in EP 09 75 8576.

* cited by examiner

*Primary Examiner* — Ian Lobo
(74) *Attorney, Agent, or Firm* — Young & Thompson

(57) ABSTRACT

A method and apparatus for detecting and classifying submerged swimming object from a passive signal generated by, and an active signal reflected from the object. In a first input of a passive mode branch a first signal representative of the passive signal is received. A second signal representative of the active signal is received in a second input of an active mode branch. In the active mode branch, the first signal is processed to generate a first classification estimate output, with first clues, of the most probable class of target for the object. In the passive mode branch, the second signal is processed to generate a second classification estimate output, with first clues, of the most probable class of target for the object. Both estimate outputs are received in a merger, for generating a merged classification estimate output with clues, which is input to a joint classifier that classifies the object.

16 Claims, 10 Drawing Sheets
(7 of 10 Drawing Sheet(s) Filed in Color)

Block diagram of system, combining active and passive branches for target classification.

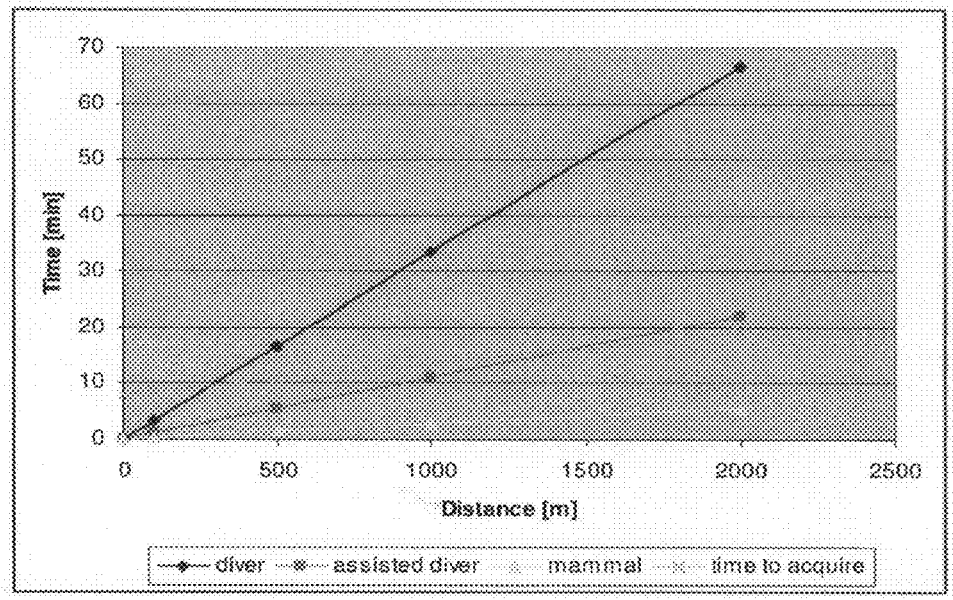
*Figure 1 Typical travel times as a function of distance for different possible threats.*
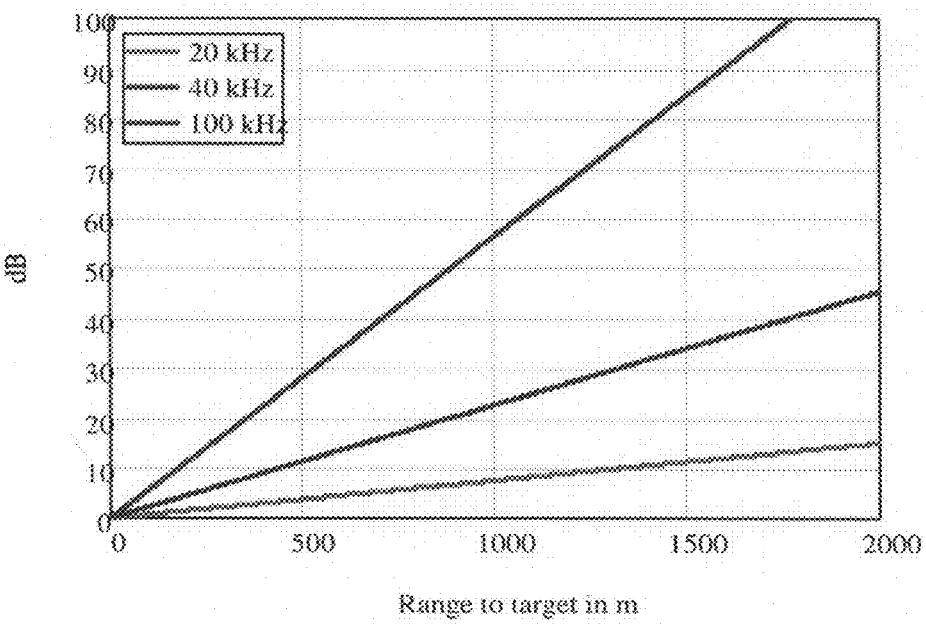
*Figure 2 Two way attenuation as function of range for the frequencies 20 kHz, 40 kHz and 100 kHz. (Francois and Garrison JASA 72 sept 82, JASA 72 dec 82).*

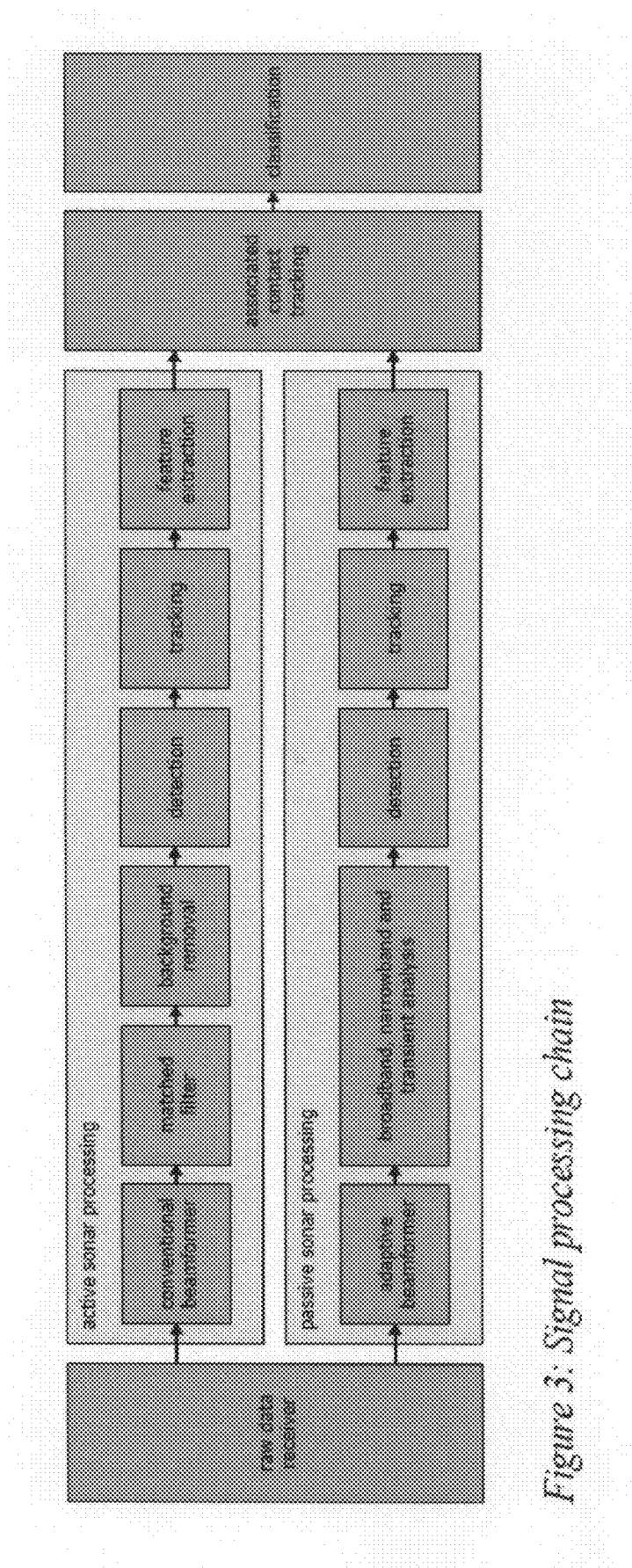
Figure 3: Signal processing chain

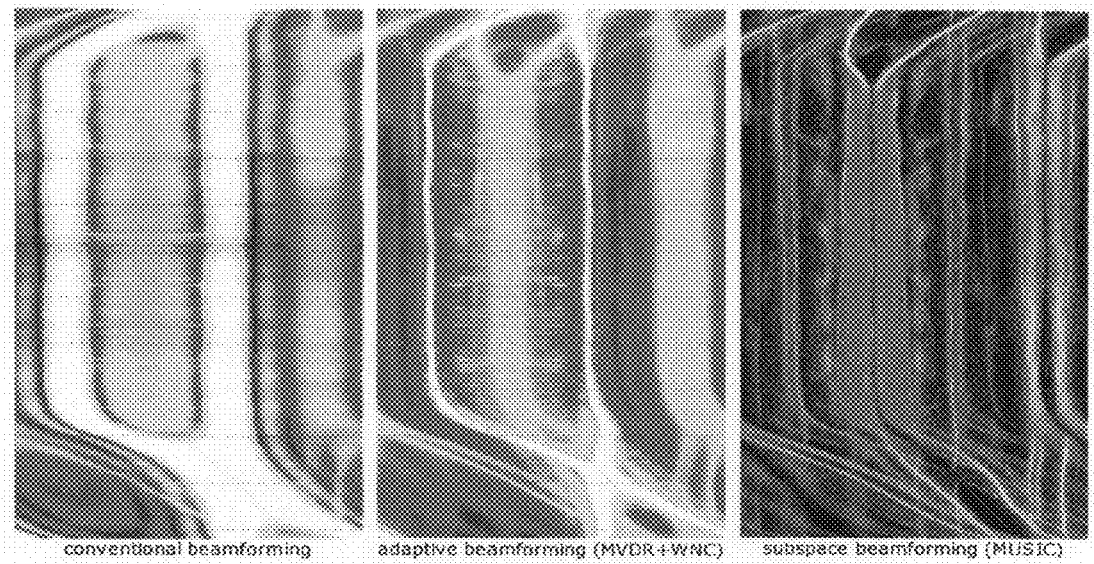
*Figure 4 A, B and C: Time-bearing plots resulting from application of various beamforming routines:*
*A: Conventional beamforming; B: Adaptive beamforming ; C: Subspace beamforming*
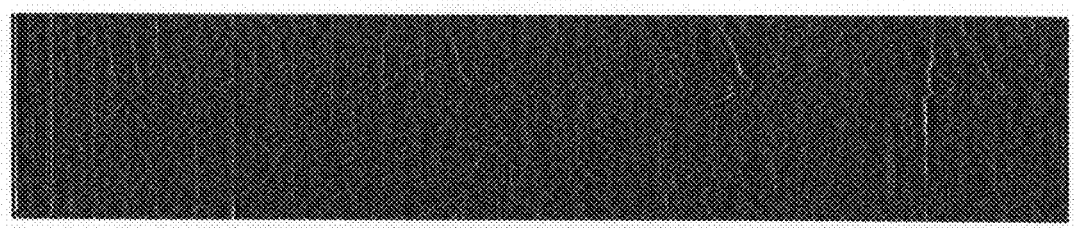
*Figure 5: Typical normalised spectrogram of UUV as a function of time.*

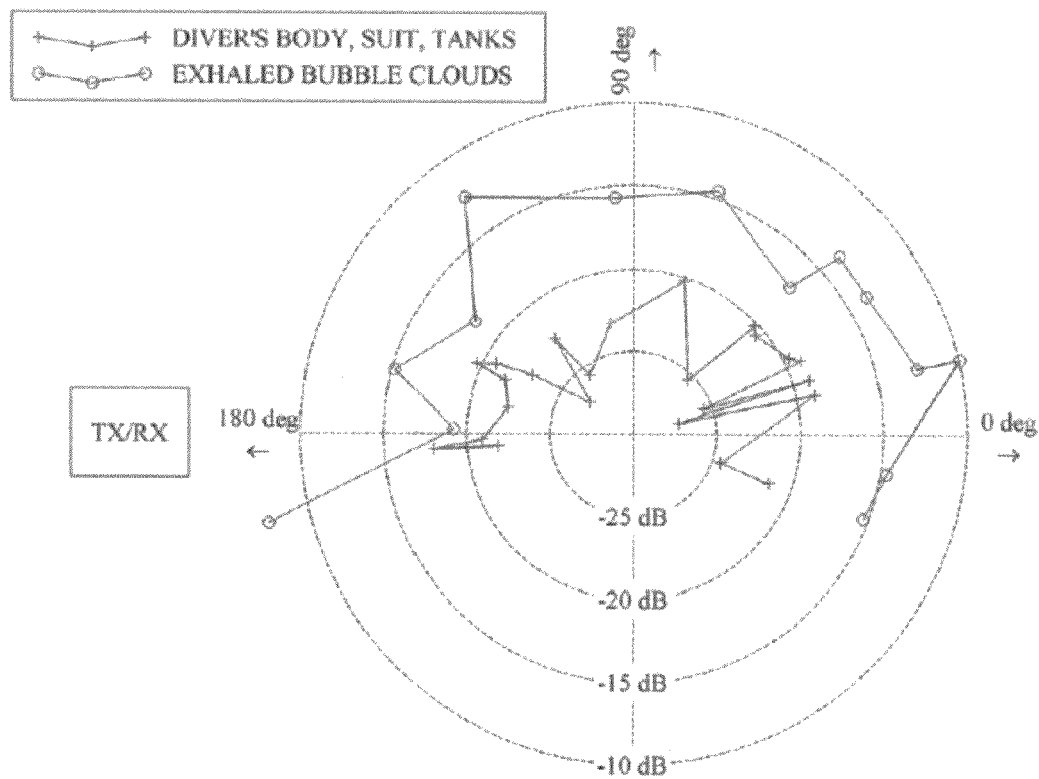
Figure 6: Echo from diver at 100kHz, from NURC report NURC-PR-2006-02

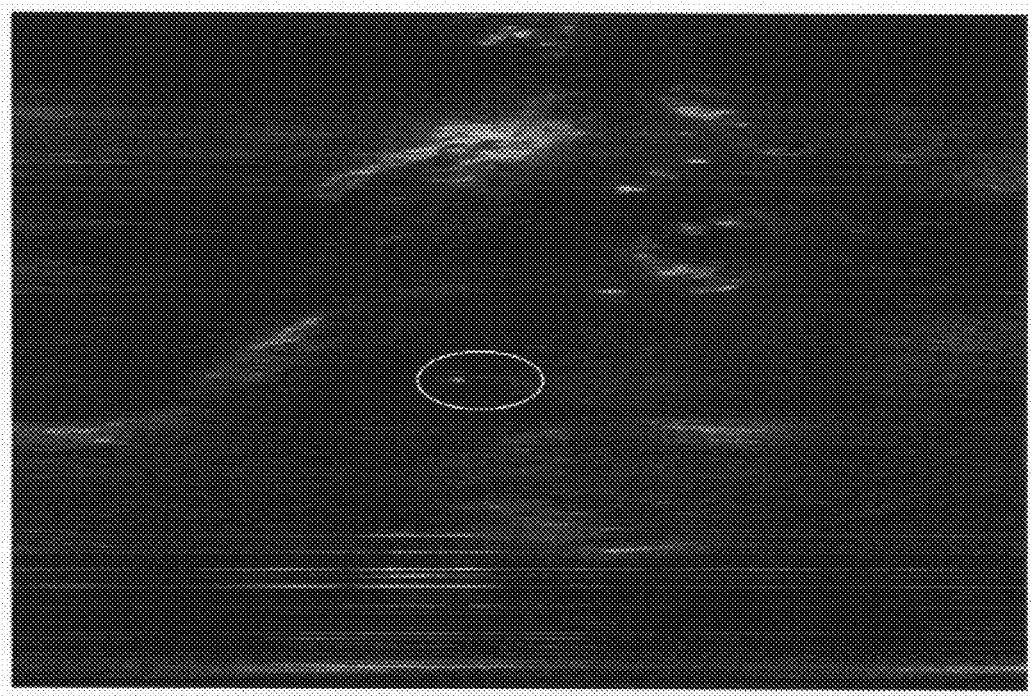
*Figure 7: Range-bearing plot with a scuba diver moving to the left.*
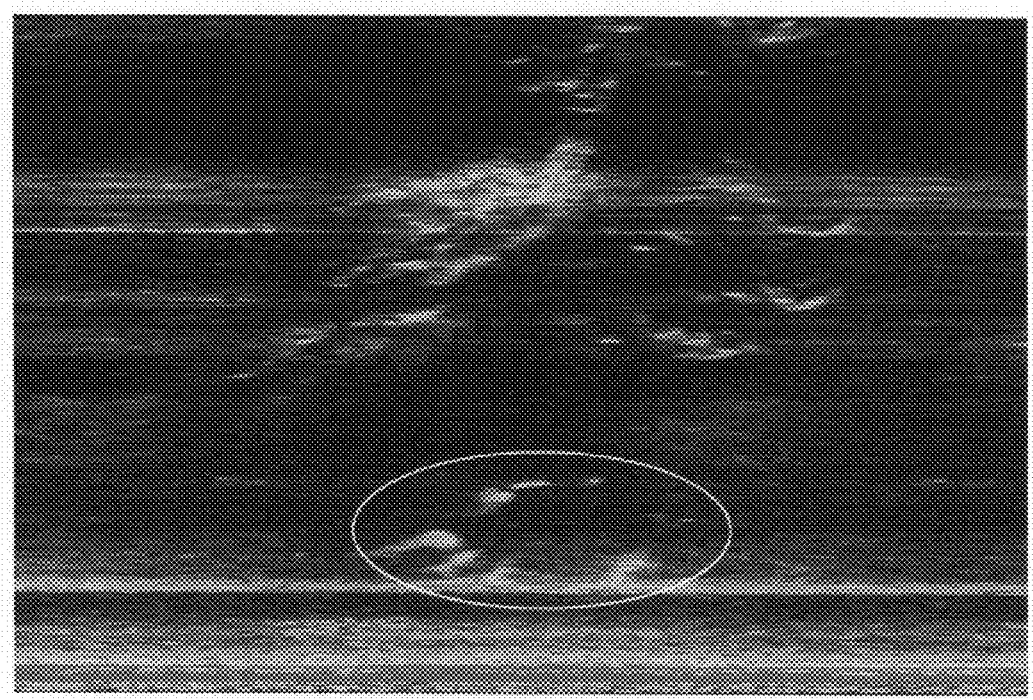
*Figure 8: Range-bearing plot containing schools of mackerel.*

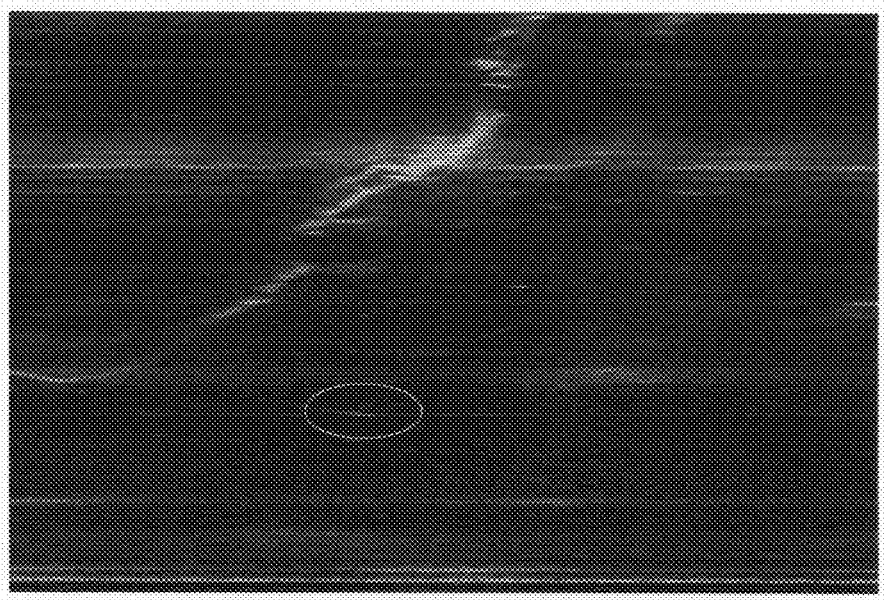
Figure 9: Range-bearing plot with a RIB.
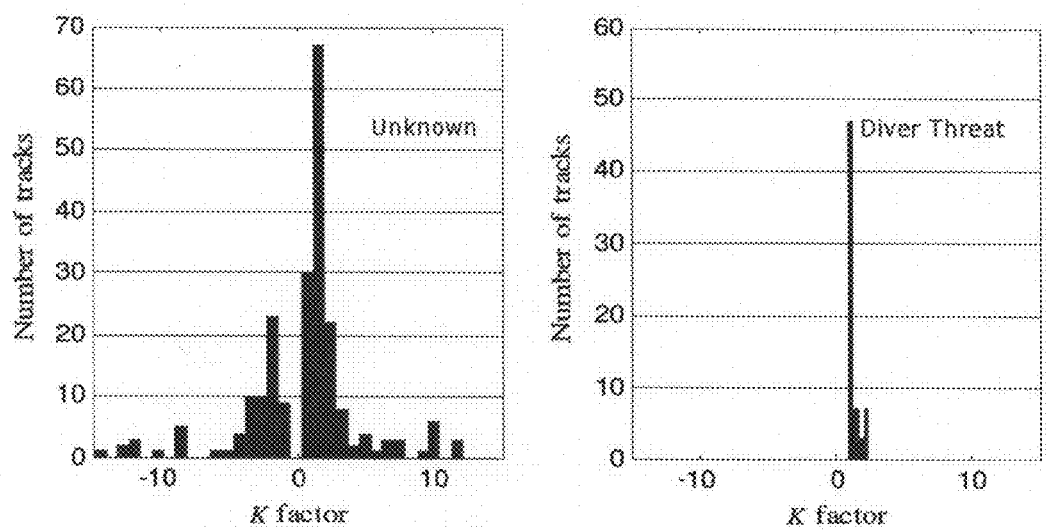
Figure 10: K factor for unknown targets and for diver threats.

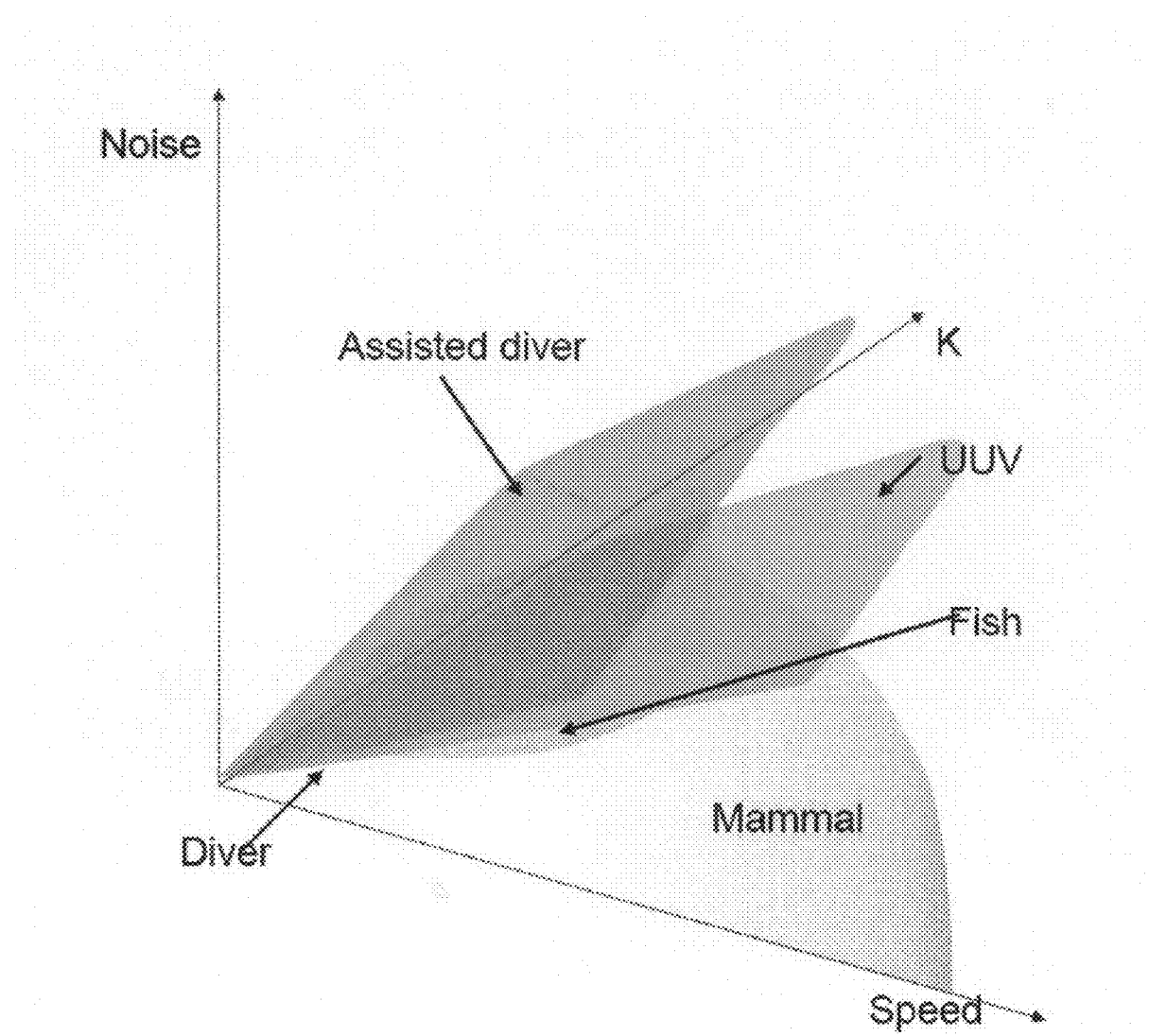
Figure 11: Groups of target with classification clues.

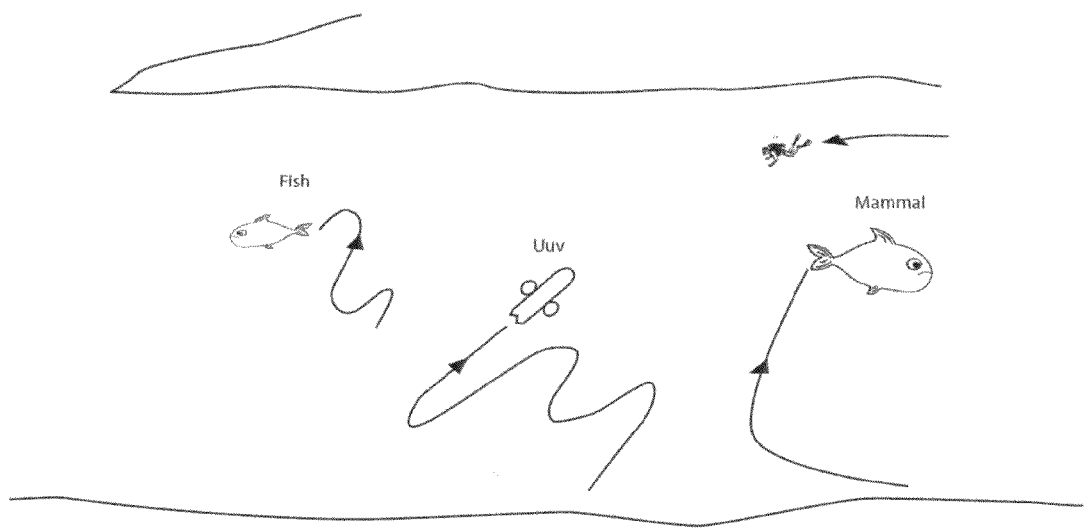
*Figure 12: General scenario, with targets*
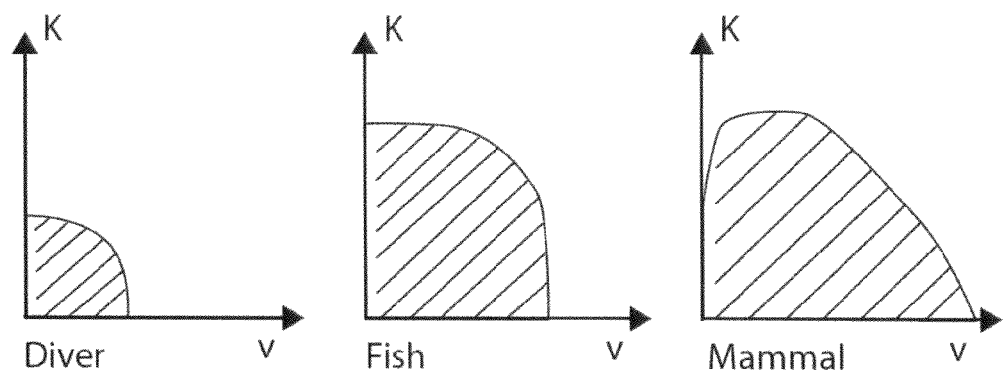
*Figure 13: K-values for typical targets*

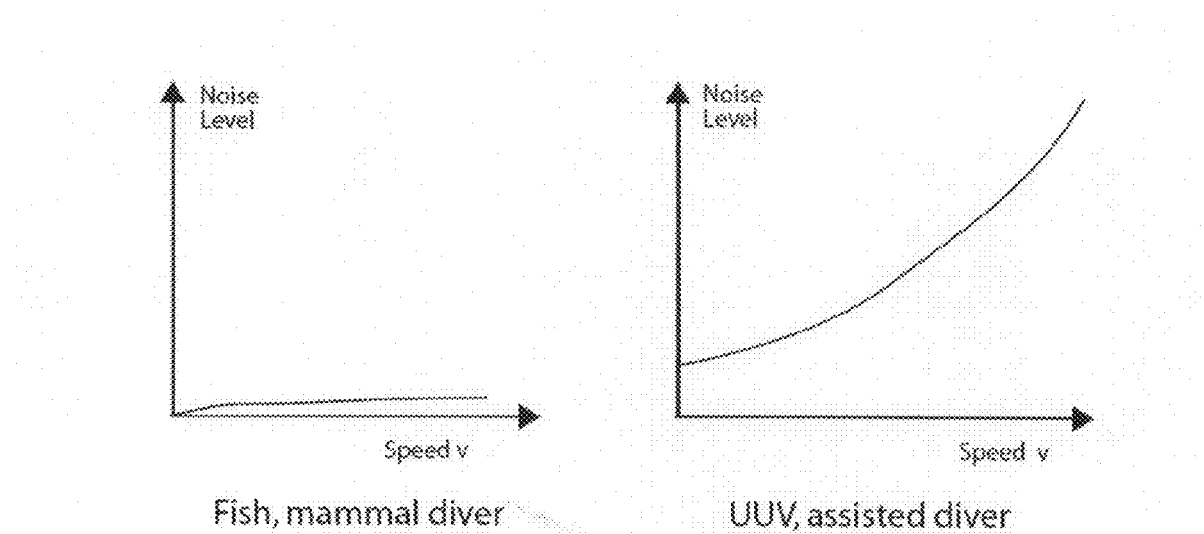
Figure 14: Noise levels for typical targets
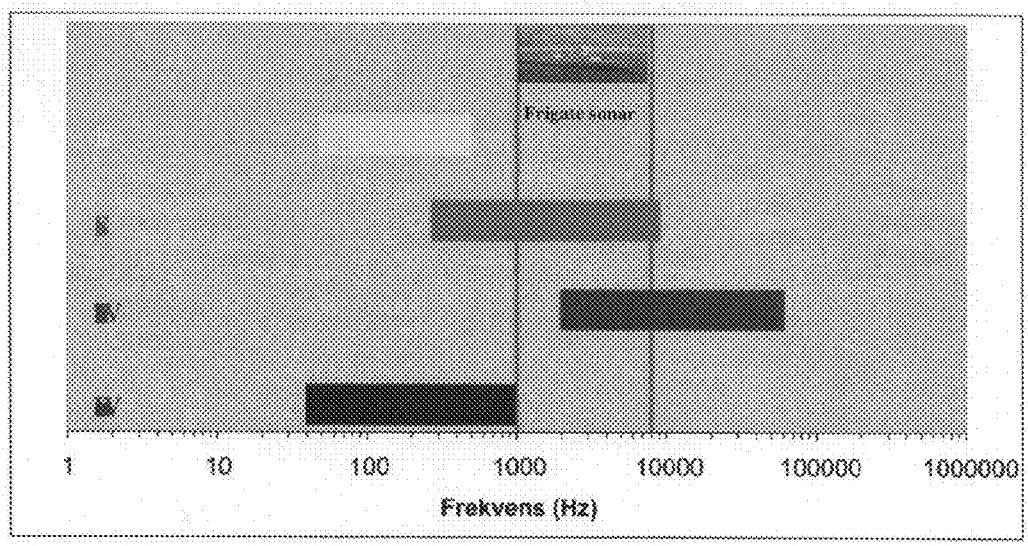
Figure 15: Characteristic Frequencies

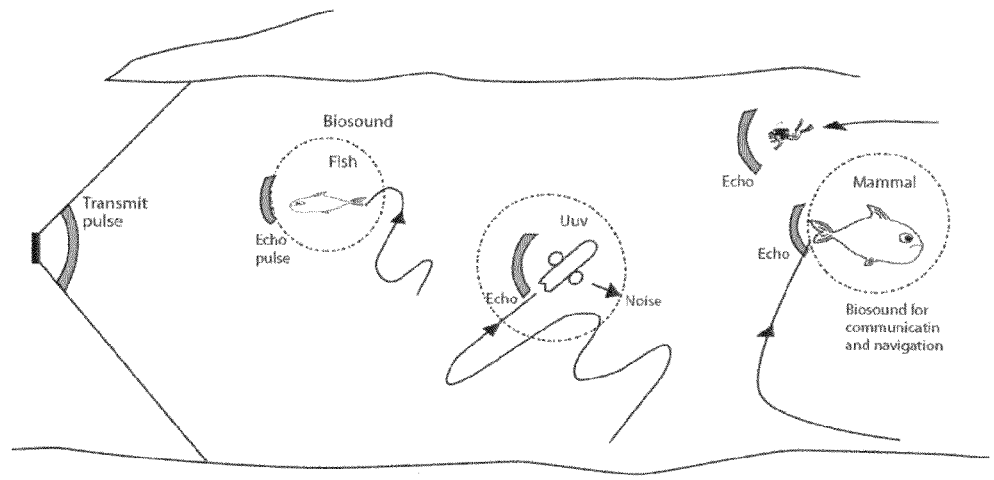
*Figure 16: Combined active and passive signal scenario.*
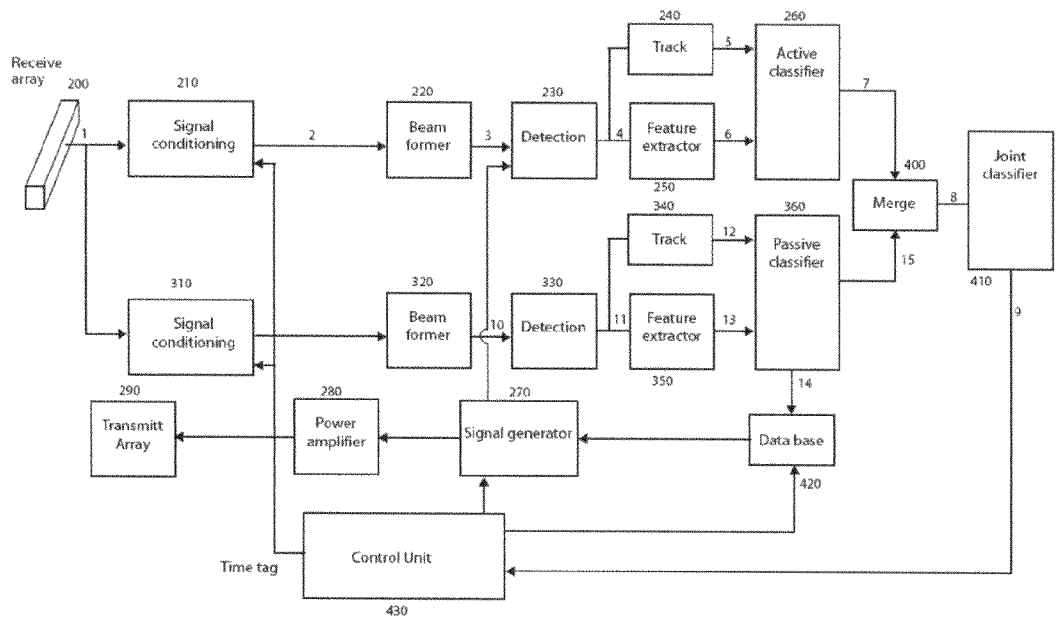
*Figure 17: Block diagram of system, combining active and passive branches for target classification.*

METHOD AND APPARATUS FOR DETECTION AND CLASSIFICATION OF A SWIMMING OBJECT

FIELD OF THE INVENTION

The disclosure relates to an apparatus and a method based on a combined use of active and passive sonar technology, which, advantageously, may be used for harbour surveillance or fleet protection. Topics discussed in the disclosure are early warning, detection and classification against typical small targets such as divers, UUV and others. Combinations are possible on the level of detection giving two detections to be combined, or for classification, either separately, and then fused, or in a joint classification process. The theoretical considerations are supported by experimental results from a novel combined active/passive sonar. The experimental sonar uses wide band active signals in the range 15-25 kHz, and a simultaneous passive process over the 1-15 kHz band. Results from detection and classification of both fish, divers and UUVs are disclosed, with weight on thereby achievable improvement in performance.

BACKGROUND OF THE INVENTION

1. Introduction

The increased focus on security for fixed installations and own ships in out-of-area situations has lead to the development and delivery of both above water and underwater protection systems. This paper will concentrate on the latter bearing in mind that the information from the above water situation may prove to be useful in the process of false alarm reduction.

The work to be presented here are threefold: one part is sonar systems for confined water, aiming to detect small and difficult targets in difficult environments, secondly to have underwater vehicles for inspection, survey and issuing countermeasures and finally the sensor integration, data fusion and overall sonar operation.

The intruder protection capability is composed of these elements, the ability to detect and classify and the ability to react. The integration of these capabilities in a command and control unit is essential for the total system capability.

BRIEF DESCRIPTION OF THE DRAWING

The file of this patent contains at least one drawing executed in color. Copies of this patent with color drawings will be provided by the Patent and Trademark Office upon request and payment of the necessary fee.

In the disclosure, the following drawings are referred to:

FIG. 1, a graph illustrating typical travel times as a function of distance for different possible threats;

FIG. 2, a graph illustrating two way attenuation as function of range for the frequencies 20 kHz, 40 kHz, and 100 kHz. (Francois and Garrison JASA 72 September 82, JASA 72 December 82);

FIG. 3, a block diagram of a signal processing chain proposed by the present invention;

FIG. 4 A, B and, graphs illustrating, by time vs. bearing plots, resulting from application of various beamforming routines: A: Conventional beamforming; B: Adaptive beamforming; C: Subspace beamforming;

FIG. 5, a graph illustrating a typical normalized spectrogram of a UUV as a function of time;

FIG. 6, a graph illustrating recorded acoustic signal of moving diver, at 100 kHz, plotted in bearing vs. level, and indicating signal components by source;

FIG. 7, a graph illustrating in a range-bearing plot a scuba diver moving to the left;

FIG. 8, a graph illustrating in a range-bearing plot containing schools of mackerel;

FIG. 9, a graph illustrating in a range-bearing plot a RIB;

FIG. 10, two graphs illustrating K factor for unknown targets and for diver threats;

FIG. 11, a 3D graph illustrating groups of target with classification clues;

FIG. 12, a sketch to illustrate an example of a general scenario, with targets;

FIG. 13, three graphs illustrating K-values for typical targets, "diver", "fish", and "sea mammal", respectively;

FIG. 14, two graphs illustrating noise levels for typical targets; in left graph fish, sea mammals or diver; in right graph UUV or assisted diver;

FIG. 15, graphs illustrating characteristic frequencies of an advantageous embodiment biosonar sound signals;

FIG. 16, a sketch to illustrate, using an example of a general scenario, with targets, a combined active and passive signal scenario; and FIG. 17, a block schematic diagram of a system example according to the invention, adapted to combine active and passive branches for target classification

2. General System Design Considerations

Coastal protection underwater, being in a harbour or in a confined area, will be complicated by the reverberant conditions and the normally busy traffic in the area.

As with most systems of this kind that operates 24/7, it is of prime importance to ease the burden of the operator. Thus the philosophy in the design has been to let the system only give a warning when something is unusual or abnormal and requires the attention of the operator. This again puts severe requirement to the signal processing, and the ability to reduce the number of "false alarms" i.e. events classified as those not requiring the attention of the operator.

An important factor in the design of a system is to provide sufficient time to react. That is the time from detection through classification, tracking, deciding which procedure to follow and finally implement adequate reaction in time to prevent any damage. Thus the time needed from detection to reaction may be substantial and thus require a large detection distance of the sonar system.

If we consider perceived underwater threats to be divers, assisted divers, UUV and mammals delivering weapons, the speed of advance will differ considerably from some 0.5 m/s to 6 m/s. Time to reach target is illustrated as a function of distance in FIG. 1.

FIG. 1 illustrates typical travel times as a function of distance for different possible threats. This time has to be compared to the sonar detection range and the sum of the times required to track and classify, and the time to react. Thus the classification of the possible threat should be reliable and take as little time as possible.

In FIG. 1 the time needed to detect, classify and initiate reaction is assumed to be 8 minutes. Thereafter the countermeasure, or reaction force, is assumed to travel to the target with a speed of 3 m/s. The total time needed to position the reaction force or the countermeasure near the target is therefore shown as "time to acquire" in the figure.

The times here are illustrative but indicate that a free swimming diver may be stopped if detected before some 400 meters while a diver with an underwater delivery vehicle would need to be detected at around 1500 meters. The use of trained mammals offers a difficult if not impossible task both due to the speed and the low target strength.

Thus it is clear that a very important requirement to the sonar system is a sufficiently large detection range for small targets under difficult and reverberant environmental conditions. The good thing however is that the geometry of the system is constant, while the environment varies with tide, season and traffic in the area. The targets will have low Doppler shift with the exception of mammals, which in turn may be the least likely ones to appear.

Long range detection requires lower frequency systems. This is easily seen by examining FIG. 2 which shows the signal attenuation as a function of range for three different frequencies. The echo at 1500 m range from a 20 kHz sonar suffers about 73 dB less absorption loss than that from a 100 kHz sonar.

FIG. 2 illustrates two way attenuation as function of range for the frequencies 20 kHz, 40 kHz and 100 kHz. (Francois and Garrison JASA 72 September 82, JASA 72 December 82).

The preferred sonar for diver detection and classification is therefore a wideband low-to-medium frequency sonar with a large receiver aperture. This will allow the exploitation of the frequency dependant characteristics of the target for classification, long range detection and high resolution in both range and bearing. The prime sonar will be active since the noise from free-swimming divers is low. However, in the passive mode, the sonar is used for early warning and the possible passive classification clues.

3. Signal Processing Chain

The general signal processing chain is illustrated in FIG. 3.

passive sonar processing active sonar processing raw data receiver matched filter background removal detection tracking classification broadband, narrowband and transient analysis detection tracking associated contact tracking feature extraction feature extraction conventional beamformer adaptive beamformer.

The active sonar processing chain is the normal one up to the background removal which includes a filter taking away the stationary objects in the sonar image and emphasising targets with some movement. The trackers are adapted multi hypothesis trackers with classes of dynamic behaviour models allowing tracking and classification to be linked. The combined track information based on measurements from both the active and passive sonar processing chains is maintained by the contact tracking module and is provided to the operator on top of a map or pictorial background.

The passive processing chain works in parallel to the active processing chain using the same transducer array in the frequency range below that of the active transmissions. The impact of the transmissions on the passive processing chain strongly depends on the pulse parameters such as source level, pulse duration, pulse interval and bandwidth as well as on the dynamic range of the data acquisition. The passive processing chain limits the impact by neglecting raw data during transmissions in an appropriate manor.

Whereas the beamformer of the active processing chain is based on a conventional delay-andsum beamformer, the beamformer of the passive chain is more advanced. The passive processing chain processes hydrophone data in a frequency range far below the design frequency of the antenna. Thus, advanced beamforming techniques have to be applied in order to obtain a bearing resolution that allows resolving dense scenarios typical of coastal areas. The capability to resolve targets is obviously essential for the extraction of acoustical features needed for the classification stage. FIG. 4 shows broadband analysis in the form of time-bearing plots resulting from different beamforming methods.

FIG. 4 includes time-bearing (i.e. time versus direction) plots resulting from application of various beamforming routines. The horisontal lower edge represents a polar angle two alpha over which the plot is made, with zero angle at center, minus one alpha at far left, and plus one alpha at far right. The leftmost edge represents time over which the msamples were recorded, with most recent samples plotted at bottom, and oldest samples plotted at top.

The targets are typically detected and tracked based on the broadband analysis, whereas the narrowband analysis is the most import input to the feature extraction of the signals arriving from the different target directions. Narrowband analysis is performed based on standard spectral analysis of the arriving signals. As part of the passive feature extraction a spectral line detector extracts frequency lines of the signals and identifies relationships between these such as harmonic frequencies and fixed frequency ratios. The classification module compares these features with the content of the classification database.

Spectral analysis of the modulation of broadband noise generated by the targets is known as DEMON analysis and can give important information about surface vessels and underwater vehicles with propeller propulsion. The number of propeller blades as well as the shaft and propeller rates are typical features that can be extracted from DEMON analysis. FIG. 5 represents a typical normalised spectrogram of UUV as a function of time.

4. Classification Clues

The over all classification scheme consists of two separate branches:
one related to attributes associated to the target as such
the other to the behaviour or pattern of behaviour of the target in relation to the perceived threat.

The target related attributes are typically among the following:
echo strength
echo variation with aspect
echo variation with frequency
target speed
target acceleration
target turn rate
emitted noise
noise spectrum or characteristics The values of the attributes related to the target can be used in a probability based classifier such as Naïve Bayes classifier. Bayesian classifiers assign the most probable class to a given example described by its attribute vector. Learning such classifiers can be greatly simplified by assuming that the attributes are independent variables for the given class.

Let $X=(x1, \ldots, x)$ be a vector of observed random variables, called attributes. The Naïve Bayes classifier will then give the most probable class Ci. The probability of having class Ci given the attributes X, is by Bayes' theorem;

$$P(C_i \mid X) = \frac{P(X \mid C_i) \cdot P(C_i)}{P(X)}$$

The conditional probability $P(X|Ci)$ is the predictions that the model makes about the data X when its parameters have a particular value x. The "prior" distribution $P(Ci)$ states what values the model's parameters might plausibly take. The normalising factor P(X) is only based on the values the attributes take on.

Bayesian Classifiers are known to be the optimal classifiers, since they minimize the risk of misclassification. However, they require defining P(X|Ci), i.e. the joint probability of the attributes given the class. Estimating this probability distribution from a training dataset is a difficult task, since it may require a very large dataset even for a moderate number of features in order to significantly explore all the possible combinations.

In the framework of the Naïve Bayes Classifier, the attributes are assumed to be independent from each other given class. This allow us to write the P(X|Ci) as:

$$P(X|C_i) = \Pi P(x_n|C_i)$$

The Naïve Bayes Classifier is therefore fully defined by the conditional probabilities of each attribute given the class.

The echo or target characteristics with aspect and frequency may give indications to the size and shape of the target. Working with frequencies where the wave length is comparable to the typical dimensions of the target may give more information than for the standard high frequency diver detections sonar working in the specular reflection region.

It is clear that the echo from the diver is less than that of the bubble cloud and difficult to use due to the rapid angular variation. In this respect, reference is made to FIG. 6, illustrating echo from diver at 100 kHz, from NURC report NURC-PR-2006-02.

FIG. 7 shows a range-bearing plot extracted from the active sonar processing chain between matched filtering and background removal. As for FIG. 4, the horisontal lower edge represents a polar angle two alpha over which the plot is made, with zero angle at center, minus one alpha at far left, and plus one alpha at far right, while the leftmost edge represents distance from sonar transducer, with shortest range of plotted distance at bottom, and largest range of plotted distance at top. Intensity of received signal is indicated by colour, increasing from blue, through green, yellow and read, with intermediate levels in respective transistional colours. A scuba diver moving from right to left can be seen (encircled). Also a bubble cloud behind the scuba diver can be observed.

A corresponding range-bearing plot with schools of mackerel present is shown in FIG. 8, in a graph format that corresponds to the format of FIG. 7 explained above. The shape of the echoes from the schools changes rapidly and is thus very different from the shape of the echoes from the scuba diver. Also the kinematics of the automatically detected tracks is typically different.

FIG. 9 shows a range-bearing plot with a RIB, in a graph format that corresponds to the format of FIGS. 7 and 8 explained above. A wake can be observed behind the RIB. As we can see from the figure, the shape of the echo is different from the mackerel. The kinematics of a RIB is typically different from both the scuba diver and the mackerel.

Looking at the inner zone targets they will typically be divers, diver bottles, UUV or breathing recycling apparatus. They all are targets with typical dimension equal or less than 1 meter, giving the resonant area of reflections ka=1 to 10 in the frequency region of 1-10 kHz.

The normal noise clues are as discussed, firstly no noise or noise. When noise is emitted the standard tools are available with relation to spectrum and relations within the spectrum. When the distance to the target is known or can be estimated (which would be the case if the target is also detected by the active processing chain) the absolute noise level as such may be estimated and used directly.

When it comes to the behaviour pattern it will normally be related to the threat the behaviour imposes. Typical patterns for a diver with a dedication to reach a goal, an erratic behaviour of a school of fish, the tidal variation of clutter and many more.

A first simple but efficient measure of the behaviour is the travel distance compared to the distance traveled towards the area of protection, high value asset. This measure K can be defined by $$K = \frac{\int v dt}{\int v_n dt},$$

where v is the speed of the target and vn is the component of the velocity vector towards the high value asset, positive towards the asset, negative away.

It is clear that all negative values of K is not threatening behaviour, likewise zero is no problem. When the K value approaches 1 the behaviour is clearly hostile. FIG. 10 shows experimental values of the K for unknown targets and for diver threats. The figures show that K for diver threats has a narrow distribution around 1, while K has a much wider distribution for unknown targets.

Another variant of the K is just to measure the total traveled distance and compare it to the distance straight line between the start and end point. This measure, L also differentiates between erratic and dedicated behaviour, a homing UUV is very close to 1, a diver will try to get 1, but will normally not succeed.

The classification clue above clearly is based on the observation over some time and this again emphasise the need to have a longer range detection to allow for the classification to take place and give trustworthy result.

Initially the grouping will be between those targets with noise, without noise, or very low in noise signifying normally man made target from natural targets, divers, mammals, fish or other biological targets.

An illustration of the different groups in a Noise, (K, Kn) and speed space is shown in FIG. 11. Thus, FIG. 11 illustrates various groups of target with classification clues.

It is clear that without the noise dimension all the targets would have appeared in the speed–K plane and made distinction even more difficult. Take the diver case the classification is found as:

diver={speed<max, K<Kd, noise=0}, and
hostile if Kn<Klimit

This may in some cases not give a unique classification, since both fish and mammals could for some time satisfy the same criteria. However over some time tracking, none of these two are likely to consistently satisfy the criteria both in K and speed.

When it comes to the distinction between assisted diver and an UUV, which both would be regarded initially as hostile anyway, clues are found in the target attributes. Typical differences are found in the noise spectrum and echo characteristics.

5. Examples

Reference if made to FIG. 12, wherein the figure shows some typical object to be found in the underwater scene, fish 100, underwater vehicles 110, mammal 120, and divers 130, the latter being assisted or unassisted. The scene may further be complicated by surface vehicles, boats 140 small, large and sailing boats.

The present invention is adapted to use classification clues to determine the type of object in the area. The clues are determined from both active and passive sonar systems and may in general include some of the following from two main classes 1. Attributes Associated to the Target as Such
    echo strength
    echo variation with aspect
    echo variation with frequency
    target speed
    target acceleration
    target turn rate
    emitted noise
    noise spectrum or characteristics
2. Target Behavior in Relation to Perceived Threat In general the classification will improve in the fidelity by adding clues.

Looking at the target behavior the determination to get to a place may strongly depend on the object and may thus be used as a clue for classification. In the following some typical behaviors will be shown to illustrate the parameters involved.
    Start looking at traveled distance
    Travel distance compared to the distance traveled towards the area of protection $$K = \frac{\int v dt}{\int v_n dt}$$

where v is the speed of the target and vn is the component of the velocity vector towards the high value asset, positive towards the asset, negative away.
K=0 is not threatening behaviour.
When K approaches 1 the behaviour is clearly hostile.

FIG. 12 shows some typical areas for the K and speed of the target space, and it is clear that the unassisted diver 131 will try to reach his destination with as little energy as possible and has a maximum speed which is lower than that of fish 100 and mammals 120. The UUV may be programmed to simulate diver or be on a search mission in which case the long term K is large. However, the UUV and or an assisted diver or vehicle will not be silent, the will radiate sound, noise, as a consequence of the propulsion and engine. The typical tracks of targets, or objects, of various, typically different, classes are illustrated in FIGS. 12 and 16 by different winding lines provided with respective arrows. FIG. 3 shows the typical relationship between the noise and the speed of the object.

Looking at the three dimensional classification space, FIG. 4 shows the combination of the speed and behaviour, and the radiated noise.

Adding more clues to the process as listed in the attributes associated with the target itself will improve the classification and will be handled in the same manner as for the clues discussed.

A simple and straight forward way to estimate the probability for a given class, 100, 110, 120 . . . of object, examples of which are illustrated by the swimming objects depicted in FIGS. 12 and 16, is detected is described in the following.

The values of the attributes or clues related to the object or target can be used in a probability based classifier such as Naïve Bayes classifier. Bayesian classifiers assign the most probable class to a given example described by its attribute vector. Learning such classifiers can be greatly simplified by assuming that the attributes are independent variables for the given class.

Let $X=(x_1, \ldots, x_n)$ be a vector of observed random variables, called attributes. The Naïve Bayes classifier will then give the most probable class $C_i$. The probability of having class $C_i$ given the attributes X, is by Bayes' theorem;

$$P(C_i \mid X) = \frac{P(X \mid C_i) \cdot P(C_i)}{P(X)}$$

The conditional probability $P(X|C_i)$ is the predictions that the model makes about the data X when its parameters have a particular value x. The "prior" distribution $P(C_i)$ states what values the model's parameters might plausibly take. The normalising factor P(X) is only based on the values the attributes take on.

Bayesian Classifiers are known to be the optimal classifiers, since they minimize the risk of misclassification. However, they require defining $P(X|C_i)$, i.e. the joint probability of the attributes given the class. Estimating this probability distribution from a training dataset is a difficult task, since it may require a very large dataset even for a moderate number of features in order to significantly explore all the possible combinations.

In the framework of the Naïve Bayes Classifier, the attributes are assumed to be independent from each other given class. This allow us to write the $P(X|C_i)$ as:

$$P(X|C_i) = \Pi P(x_n|C_i)$$

The Naïve Bayes Classifier is therefore fully defined by the conditional probabilities of each attribute/clue given the class.

FIG. 15 illustrates a "complete scenario", with the active sonar pings and possible echoes, and the "noise" radiated from the non natural objects, such as for example due to the propulsion. In addition, in FIG. 15 it is indicated the natural sounds that is from time to time transmitted from the fish and mammals for communication, navigation or other purposes.

The sonar system embodiment example describe herein, combines active and passive sonar, based on a set of "standard building blocks", both active and passive, that are modified in accordance with the invention, and introduces also new building blocks in each of the active and passive branches of the system example embodiment. The inventive system of the invention typically utilizes combined processing units as the one example discussed herein, for classification based on the combination of active and passive branches.

Block diagrams of exemplary sonar embodiments of the invention are provided in FIGS. 3 and 16.

Reference is first made to FIG. 16 for the following explanation. Blocks numbered in the 200 range are referred to as the active part blocks, blocks numbered in the 300 range are referred to as the passive part blocks, and blocks numbered in the 400 range are referred to as the added joint blocks.

The sonar is as explained herein "soft started", in active modus, and the receive array 200 receives the echoes from the active transmissions and also wide band noise in the area covered by the receive array. The receive signal 1 provided by the receive array 200 is delivered to respective inputs of two signal conditioning units, labelled 210 and 310, respectively. The active branch signal conditioning unit is a filter 210, which filters the received signal with the proper band-with corresponding to the transmit bandwidth, and preamplifies and performs A/D conversion, to output digitalized data 2.

The digitalized data 2 is time tagged from the control unit 430. The beamformer 220 converts the element data stream provided by signal conditioning unit 210 into data streams for each of a number of special beams formed by the array. The beam former 200 is adapted to handle the wide band width, and is advantageously implemented as a time delay beam former, or operates in the frequency domain, to provide similar characteristics.

The output 3 of the beamformer 220 gives the received signal in each beam as a function of time, or as a function of distance from the array. The detection unit 230 performs data reduction by removing stationary targets, and detects other targets above a predetermined detection threshold.

The events output 4 of the detection unit 230 is fed to the tracker 240 and the feature extractor 250. The tracker may be implemented in many ways, advantageously using Kalman filter technology, or as multi hypothesis tracker, as examples, to provide a position output 5.

The position output 5 from the tracker 240 provides position of detected targets as function of time, and the target kinematic attributes such as velocity, acceleration and heading, while the feature extractor 250 is adapted to determine attributes of the targets related to the acoustic properties of the target, such as target strength, and variation with aspect and frequency, and provides on an output 6 the attributes to the active classifier 260.

Based on the attribute output 6 of the feature extractor 250, the active classifier 260 provides, as described in the section dealing with classification, an estimate output 7 of the most probable class of target based on the active clues presented on the output 5 of the tracker 240 and the output 6 of the feature extractor.

The estimate output 7, with its clues 5 and 6, is input to the merge unit 400, in which the estimates for active and passive detections and attributes are merged in consideration of primarily their space related characteristics, although other characteristics that indicate a relationship between estimate outputs from the active and passive branches may be employed to determine relationships between outputs of the branches, to provide-combined active and passive clues for the tracked targets, on an output 8, which is input to the combined classifier 410. Experimental wok has indicated, that as many as 90% of outputs from the active classifier has a "companion" output from the passive classifier, resulting in a merged output from the merger. The merger is advantageously adapted to deliver on its output the input from the active classifier in case that the merger cannot determine that the input received from the active classifier does not have a "companion" in the inputs received from the passive classifier.

By generally applying the statistical processing detailed in an earlier part of this disclosure to the input received from the merger, the combined classifier 410 provides a combined classification output 9.

The classification output 9 of the combined classifier 410, is input to the controller 430. In the control unit 430, if the classification output 9 yields a mammal detection, the controller changes the operating mode of the system to a "mammal mode", typically by reducing the power of the signal to be output from the transmit array 290, or selects transmission of recorded biosound that is made available from the sound database 420. Typically, when entering the "mammal mode", the control unit 430 then sets the signal generator 270 to use an appropriate sound available from the data base 420 for an active output signal, and also sets the detection unit 230 to correlate the beamformer output 3 provided by the beamformer 220 with the same, or a replica of the active output signal selected to be transmitted in the "mammal mode".

The active output signal of the signal generator 270, thus provided according to a selection made by the control unit based on the classification output 9, is fed to the power amplifier 280, which, in turn, feeds the amplified active output signal to the transmit array 290, for radiating an acoustic signal as a sound corresponding to the selected active output signal into the water.

It should be understood, that the selected active output signal typically is of a pulsed nature, however, other temporal variations may be employed to achieve a desired repetitive pattern, of the signal may be varied over time by other means to allow an echo of the active output signal to be detected as it appears distinguished from other acoustic signals received from the environment in which the system may operate.

The "passive chain" of the system of the invention includes a signal conditioner 310, for signal conditioning, preamplifying and A/D conversion 310, and for time tagging received signal by way of the control unit 430. It is appreciated, that the signal conditioner 310 generally operates as described above for the signal conditioner 210 in the "passive chain" part of the system. The beamformer 320 receives the output of the signal conditioner 310, and is preferable realized as an adaptive beam former, or a high resolution one to give the required special resolution.

The beam out put 10 of the beamformer 320 is fed to the detection unit 330, where broad and narrow band frequency analysis, as well as transient analysis is performed prior to detection it self, to output detections 11.

The detections 11 are input to the tracker 340 and feature extractor 350. Depending on the number of receiving units included in the system, the tracker may be operating based only on bearing, or it can make cross track correlations, to generate the tracker output 12. The tracker output 12 of the tracker 340 provides the bearing versus time, and derived kinematic attributes, while the feature extractor 350 provides a feature output 13 that provides target attributes, such as for example spectrum level and transient characteristics.

The tracker output 12 and the feature output 13 are both are provided as inputs to the passive classifier 360. The passive classifier 360 is adapted to classify a received signal as being a mammal sound class signal. If the classifier determines there is a mammal sound being detected, the signal is considered a "biosound", which is delivered on a biosound output 14 to the database 420, or as a signal to other circuitry of the system to make a recording of the mammal sound to be stored such that the sound may be made available by the database 420 or a similar sound data repository. The passive classifier 360 may include a passive detections output 15.

The passive detections outputs 15 and their clues are provided to the merge unit 400, which provide the merge output 8 to the joint classifier 410 to allow joint classification to be performed.

In a variant of the system described above, the blocks 260, 360, 400 and 410 are combined into one comprehensive active passive classifier. Accordingly, the disclosure of the invention provided above by way of a system embodiment of the invention, has been chosen to make also intuitively described the various steps of the process performed in an operating system by the functional elements disclosed herein.

Accordingly, this disclosure provides to the skilled person in the relevant art all technical information and etchings required for him to perform the invention as a method implementing the functionalities disclosed, to obtain in the same novel way any result provided by the invention, which method may, alternatively, be performed by way of a computer program appropriately coded and executed in a programmable device, such as a computer. Thus, it is envisioned that the invention may be embodied, in full or in part, as a method, an apparatus, or a computer program.

5. Summary

The inclusion of a passive chain in the sonar system for harbour or coastal surveillance gives a number of benefits:
- passive early warning
- easy distinction of man made targets
- passive classification The active part of the classification adds further clues, and the sonar should preferably be designed to have a long range in terms of distance, and a high resolution, to allow tracking to take place over long time to differentiate on behaviour.

6. Characteristic Frequencies of "Biosonar" Sound

Reference is made to FIG. 15. The sound transmitted from sea mammals are diverse; it varies from one species to another specie, and from one region to another region. In Norwegian waters alone, there are as many as 17 different species of whales. Frequency ranges of the transmitted sound for some different groups of sea mammals are illustrated in FIG. 15. For comparison, also frequency ranges of the transmitted sound from fish and a typical frigate sonar is also plotted in FIG. 15. The frequency range of fish, is dominantly below 1 kHz. As can be seen from FIG. 15, there is no single frequency band used exclusively by sea mammals, they operate in respective bands that are spread out over the a range from some 50 Hz to about 100 kHz. For the coastal areas including ports, the dominant species are the seals and the Odontoceti (toothed whales), which use the typical sonar frequencies from about 1 kHz to 100 kHz. The sound picture transmitted by theses species again is complex and varied, and is generally not possible to describe in closed mathematical form. In respect of the present invention, the best solution contemplated is to use not a pre-described waveform as is done in conventional sonar systems using wideband transmissions with defined coded pulses, but instead to use the sound presented by natural sea mammals, by recording waveforms from the species known to operate in an area of interest, and taking the recorded waveforms from the species in the region where the sonar system is operating and select waveforms that the mammals do not react unfavourable to. Thus the same environmentally adaptable sonar system may very well transmit different pulses when moved from one place to another.

In an advantageous embodiment of the present invention, it includes a sound signal generating means that is adapted to store and reproduce a sea mammal sound recording of a natural sound of a seal in a frequency band ranging from 180 Hz to 9000 Hz, of a natural sound of a toothed whale in a frequency band ranging from 2000 Hz to 60000 Hz, or of a natural sound of a baleen whale in a frequency band ranging from 40 Hz to 1000 Hz.

This environmental adaptivity is an important aspect of a system according to the present invention, in order for it to provide a sea mammal friendly system, and to be capable of operating without disturbing their natural behaviour, taking into consideration that the species normally have their best hearing sensitivity in the frequency band used for making their sounds. Thereby, transmitting the usually employed frequency modulated pulses or other synthetic waveforms in the typical sonar frequencies described above is avoided, which otherwise will in general be perceived by mammals as unnatural, and could be regarded as disturbing noise that would upset the sea mammals, and, if at high levels, could deteriorate their hearing.

In consideration of these factors, the present invention provides significant advantages over other solutions in a world and time of increasing awareness of the impacts of mans doings on the living conditions of other species that dwell in the seas and oceans.

The invention claimed is:

1. Apparatus with a changeable operating mode for detection and classification of a submerged moving object from a passive signal generated by the object and an active signal reflected from the object, the apparatus comprising:
   an active mode branch having an input for receiving a first signal representative of the active signal;
   a passive mode branch having an input for receiving a second signal representative of the passive signal,
   wherein the active mode branch includes first signal processing means adapted to generate a first classification estimate output with first clues of the most probable class of target for the object, and the passive mode branch includes second signal processing means adapted to generate a second classification estimate output with first clues of the most probable class of target for the object;
   a merger adapted to receive and merge said first and second classification estimate outputs, and to output a merged classification estimate output with clues;
   a classifier arranged to receive said merged classification estimate output with clues, and adapted to classify the object by performing classification based on said merged classification estimate output with clues; and
   a controller adapted to change the operating mode of the apparatus based on a result of the classification by said classifier.

2. The apparatus of claim 1, further comprising sound signal generating means controlled by said controller for generating a sound signal according to the result of the classification.

3. The apparatus of claim 1, wherein the first clues from the second signal processing means of the passive mode branch indicate object classification of at least one of a sea creature, a diver, an assisted diver, and an underwater vehicle.

4. The apparatus of claim 1, further comprising sound signal generating means controlled by said controller and adapted to generate a sound signal corresponding to a natural sound of at least one sea creature, including a sea mammal, when the operating mode is changed and the at least one sea creature is classified.

5. The apparatus of claim 4, wherein the sound signal generating means includes storage means arranged to store data or signals for generating the sound signal.

6. The apparatus of claim 5, wherein the storage means is arranged to be responsive to an output the classifier indicating a positive classification of the object, to store a signal received in at least one of the active and passive branches arranged to store said data or signal effective for the generator to generate the sound signal.

7. The apparatus of claim 4, wherein the sound signal generating means is adapted to store and reproduce a sea mammal sound recording of at least one of a natural sound of a seal in a frequency band ranging from 180 Hz to 9000 Hz, a natural sound of a toothed whale in a frequency band ranging from 2000 Hz to 60000 Hz, and a natural sound of a baleen whale in a frequency band ranging from 40 Hz to 1000 Hz.

8. The apparatus of claim 1, further comprising a detection unit controlled by said controller and adapted to correlate an output signal from a beamformer according to the result of the classification by said classifier.

9. A method for detection and classification of submerged moving object from a passive signal generated by the object and an active signal reflected from the object, the method being performed in an apparatus with a changeable operating mode and comprising:

receiving at an input of an active mode branch a first signal representative of the active signal;

receiving at an input of a passive mode branch a second signal representative of the passive signal;

processing in the active mode branch the first signal to generate a first classification estimate output with first clues of the most probable class of target for the object;

processing in the passive mode branch the second signal to generate a second classification estimate output with first clues of the most probable class of target for the object;

receiving said first and second classification estimate outputs in a merger and generating a merged classification estimate output with clues;

receiving said merged classification estimate output with clues in a classifier and classifying the object by performing classification based on said merged classification estimate output with clues; and in a controller, changing an operating mode of the apparatus based on a result of the classification by the classifier.

10. The method of claim 9, further comprising generating a sound signal based on the result of the classification.

11. The method of claim 10, further comprising storing data or signals for generating the sound signal.

12. The method of claim 11, wherein the storage of the data or signals is responsive to an output of the classifier indicating a positive classification of the object.

13. The method of claim 11, wherein the data or signals for signal generating the sound signal is adapted to reproduce a sea mammal sound recording of at least one of a natural sound of a seal in a frequency band ranging from 180 Hz to 9000Hz, a natural sound of a toothed whale in a frequency band ranging from 2000Hz to 60000Hz, and a natural sound of a baleen whale in a frequency band ranging from 40 Hz to 1000 Hz.

14. The method of claim 9, further comprising correlating, in a detection unit controlled by the controller, an output signal of a beamformer according to the result of the classification.

15. The method of claim 9, wherein the first clues from the passive mode branch indicate object classification of at least one of a sea creature, a diver, an assisted diver, and an underwater vehicle.

16. The method of claim 9, further comprising generating a sound signal corresponding to a natural sound of at least one sea creature, including a sea mammal, when the operating mode is changed and the at least one sea creature is classified.

\* \* \* \* \*